United States Patent
Kapaan

(10) Patent No.: US 7,976,223 B2
(45) Date of Patent: Jul. 12, 2011

(54) BEARING UNIT COMPRISING A SHEET METAL ELEMENT

(75) Inventor: Hendrikus Kapaan, Nieuwegein (NL)

(73) Assignee: AB SKF, Gothenburg (SE)

( * ) Notice: Subject to any disclaimer, the term of this patent is extended or adjusted under 35 U.S.C. 154(b) by 880 days.

(21) Appl. No.: 11/720,662

(22) PCT Filed: Dec. 6, 2005

(86) PCT No.: PCT/NL2005/050063
§ 371 (c)(1),
(2), (4) Date: Dec. 12, 2007

(87) PCT Pub. No.: WO2006/062407
PCT Pub. Date: Jun. 15, 2006

(65) Prior Publication Data
US 2008/0247701 A1    Oct. 9, 2008

(30) Foreign Application Priority Data

Dec. 6, 2004   (EP) .................................. 04078298

(51) Int. Cl.
*F16C 13/00*   (2006.01)
*F16C 33/42*   (2006.01)

(52) U.S. Cl. ........................................ 384/544; 384/569

(58) Field of Classification Search ................. 384/449, 384/477, 513, 544, 569; 180/259, 263, 385
See application file for complete search history.

(56) References Cited

U.S. PATENT DOCUMENTS

| | | | |
|---|---|---|---|
| 3,295,626 A * | 1/1967 | Cadiou | 180/259 |
| 3,860,301 A | 1/1975 | Zerbola et al. | |
| 4,240,680 A * | 12/1980 | Krude et al. | 384/477 |
| 4,359,128 A * | 11/1982 | Krude | 180/385 |
| 4,405,032 A | 9/1983 | Welschof et al. | |
| 4,529,254 A * | 7/1985 | Krude | 384/449 |
| 4,571,099 A * | 2/1986 | Balken et al. | 384/544 |
| 5,486,053 A * | 1/1996 | Beagley et al. | 384/513 |
| 5,725,285 A * | 3/1998 | Niebling et al. | 384/544 |
| 5,762,559 A * | 6/1998 | Jacob et al. | 384/544 |
| 6,139,216 A * | 10/2000 | Bertetti | 464/906 |
| 6,174,088 B1 | 1/2001 | Miyazaki | |
| 6,450,585 B1 | 9/2002 | Kochsiek | |
| 6,790,145 B2 * | 9/2004 | Niebling et al. | 384/544 |
| 7,621,817 B2 * | 11/2009 | Cermak | 464/178 |
| 2003/0006655 A1 * | 1/2003 | Zhang | 310/52 |

FOREIGN PATENT DOCUMENTS
EP    0 653 315    5/1995

* cited by examiner

*Primary Examiner* — Marcus Charles
(74) *Attorney, Agent, or Firm* — Vedder Price P.C.

(57) ABSTRACT

A bearing unit comprises a rolling element bearing with at least two rings which are each provided with at least one raceway and at least one set of rolling elements which are in contact with the raceways as well as at least one tubular sheet metal element connected to one of the rings. The sheet metal element at least partly has a mounting part with non-circular cross section, and the mounting part being mounted to a counter-part with a correspondingly non-circular cross-section of the ring or connected to the ring.

22 Claims, 4 Drawing Sheets

BEARING UNIT COMPRISING A SHEET METAL ELEMENT

BACKGROUND AND SUMMARY OF THE INVENTION

The invention is related to a bearing unit, comprising a rolling element bearing, the bearing comprising at least two rings which are each provided with at least one raceway and at least one set of rolling elements which are in contact with the raceways, as well as at least one tubular sheet metal element connected to one of the rings.

Such a bearing unit is known, for instance from U.S. Pat. No. 3,860,301. The prior art bearing unit comprises sheet metal elements which are connected to each other. The sheet metal elements are carried out as bearing rings which enclose several rows of rolling elements.

The object of the invention is to provide sheet metal elements for the purpose of adding further mechanical features to the bearing unit, such as increasing the strength and/or stiffness of the bearing unit. Also, it is desirable to enable the transfer of forces and/or torques through such sheet metal elements.

The object is achieved in that the sheet metal element at least partly has a mounting part with non-circular cross section, the mounting part being mounted to a counter part with a correspondingly non-circular cross section of the ring or connected to the ring.

The non-circular part of the sheet metal element may serve several functions. First of all, it may provide additional stiffness to e.g. the bearing onto which it is connected. This may in particular be so in case the sheet metal element has e.g. a triangularly shaped cross section. Furthermore, the non-circular shape may provide a torque transfer means. In this connection, the counter part may comprise a cap connected to the inner ring.

According to the invention, the sheet metal element has a circular part which is opposite the inner surface of the inner ring, and a non-circular part which is tightly fitted within a correspondingly non-circular hollow part of the cap. Additionally, the circular part of the sheet metal element can be tightly fitted within the inner ring. Furthermore, the sheet metal element may have an end wall which closes one end of the tubular part. In that case, the cap and the end wall of the sheet metal element can be connected to each other through e.g. a screw/nut connection.

Furthermore, the sheet metal element may have an end wall which closes one end of the tubular part. In that case, the cap and the end wall of the sheet metal element can be connected to each other through e.g. a screw/nut connection.

The non-circular shape of the sheet metal element may take several forms; preferably, the cross section of the non-circular part can comprise e.g. three rectilinear wall sections which are angled with respect to each other.

In a further embodiment of the invention, the bearing unit according to the invention may be provided with a constant velocity joint which is connected to, or comprises, the tubular sheet metal element. As will be clear, the transfer of a driving torque to the rotating ring of the bearing plays an important role in this connection. Preferably therefore, the constant velocity joint has an axle stub provided with a noncircular cross section, the axle stub being tightly fitted within a correspondingly shaped space in the tubular sheet metal element. By means of the non-circular shapes of the axle stub of the constant velocity joint and of the sheet metal element, the torque transfer can be ascertained.

According to a particular embodiment, the axle stub has a shoulder onto which one end of the tubular sheet metal element bears. Also, the axle stub comprises a screw threaded bore and the end cap comprising aligned opening, the cap, sheet metal element and axle stub being drawn together by means of a screw accommodated in the opening and in the screw threaded bore.

According to a further alternative embodiment, the sheet metal element forms an integrated part of the constant velocity joint, the part being of non-circular cross section and being tightly fitted within a correspondingly non-circular hollow part of the cap.

For the fixation of joining of the several components addressed before, in particular the flanges of the cap and the flanges of the rings, several possibilities exist. These encompass mechanical means, such as riveting, energy welding, laser welding, spot welding or gluing. Also, cold rolling or orbital forming techniques can be applied to lock-up the rolling bearing section or to join the bearing parts. The materials used can be metallic or non-metallic. The latter case encompasses composite materials, powder materials or combinations of these. Of course, the joining or fixation depends on the materials applied.

BRIEF DESCRIPTION OF THE SEVERAL VIEWS OF THE DRAWING

The invention will now be described further with reference to several embodiments shown in the figures.

DETAILED DESCRIPTION OF THE INVENTION

Figure 1:
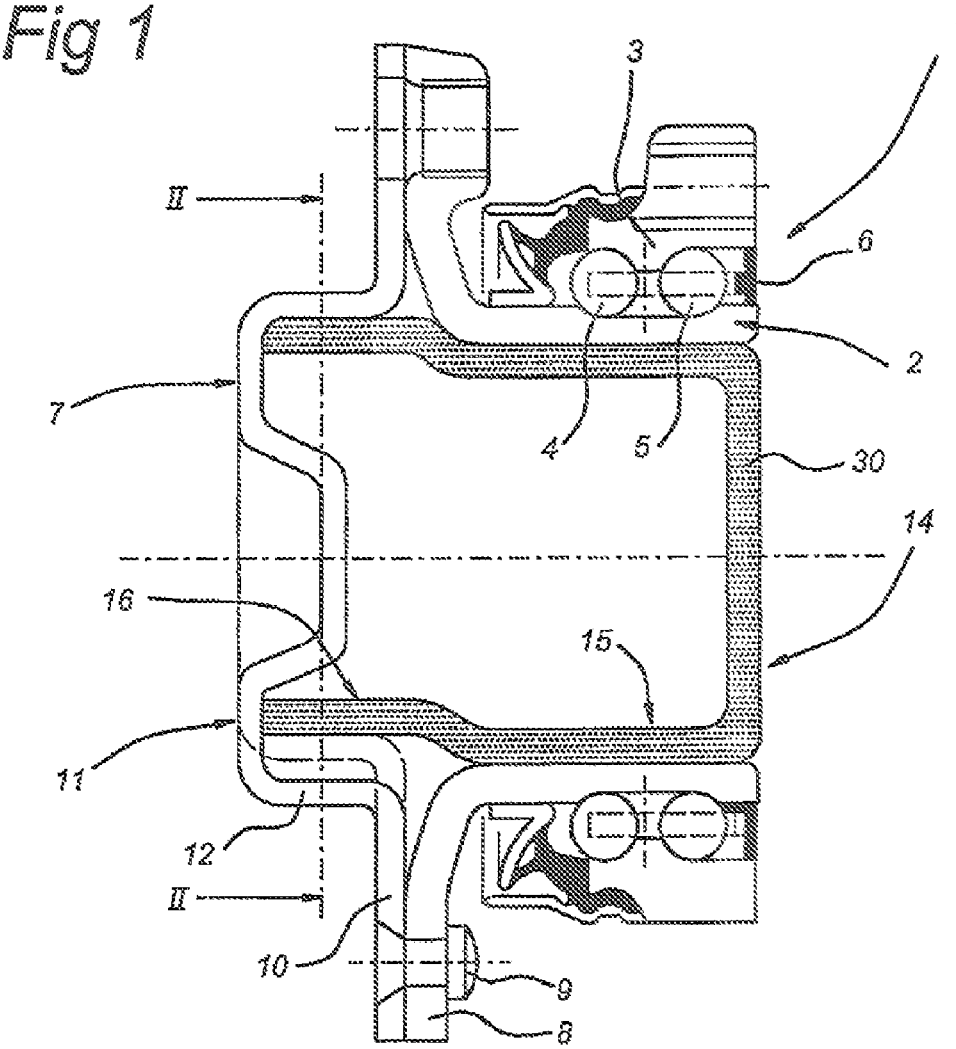
FIG. 1 shows a cross section with a bearing unit with a sheet metal element according to the invention.

The bearing unit shown in FIG. 1 comprising a rolling element bearing 1, which has an inner ring 2 having a cylindrical inner bore and an outer ring 3. Between the rings 2, 3, two sets of balls 4,5 are accommodated. These balls are spaced with respect to each other by means of a cage 6.

Figure 2:
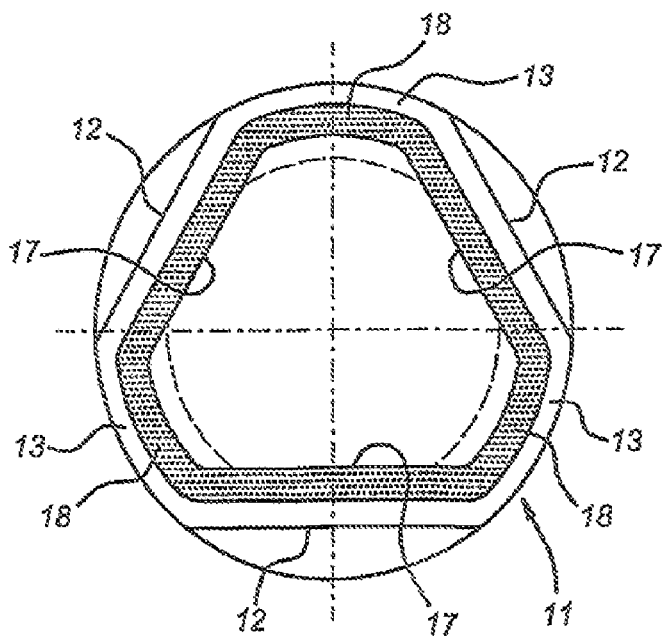
FIG. 2 shows the cross section according to II-II of FIG. 1.

The inner ring 2 has an outwardly extending flange 8, onto which the cap 7 has been connected by means of rivets 9. Alternatively, energy welding, e.g. laser welding or spot welding, may be applied. This cap has a flange part 10 and a counterpart 11 of a non-circular cross section as shown in FIG. 2. This non-circular cross section comprises three rectilinear wall parts 12, connected to each other by means of bent parts 13.

According to the invention, the sheet metal element 14 has been provided, which comprises a cylindrical part 15 as well as a non-cylindrical part 16 provided with rectilinear wall parts 17 as well as bent wall parts 18. As shown in FIG. 2, this noncylindrical part 16 is tightly fitted within the counterpart 11 of the end cap 7.

Furthermore the cylindrical part 15 of the sheet metal element is tightly fitted within the inner ring 2. The sheet metal element may also be provided with an end wall 30. Thereby, a stiffening effect is obtained for the bearing unit.

Figure 3:
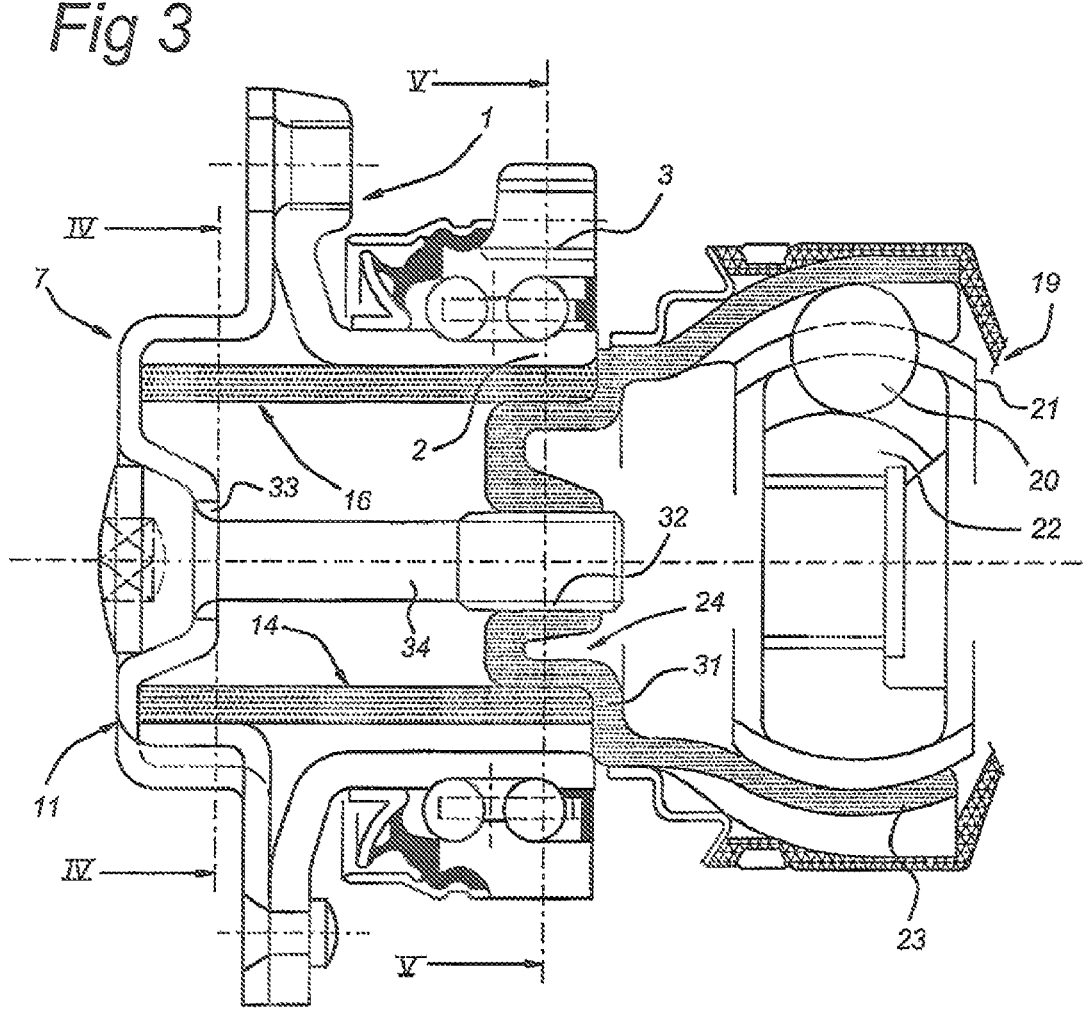
FIG. 3 shows the bearing unit including a constant velocity joint with a sheet metal element according to the invention.
Figure 5:
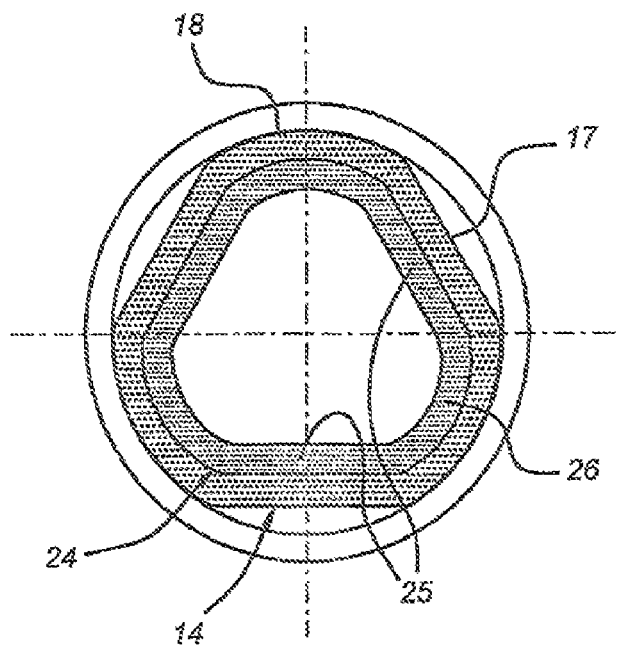
FIG. 5 shows a cross section according to V-V of FIG. 3.

In the embodiment shown in FIG. 3, the bearing unit is also provided with a constant velocity joint 19. This constant velocity joint 19 comprises a series of balls 20, a cage 21 and an inner ring element 22. Furthermore, the outer ring element 23 is provided with an axle stub 24 of non-circular cross section as shown in FIG. 5. The non-circular cross section is formed by the rectilinear wall sections 25 which are mutually connected by bent wall parts 26.

Figure 4:
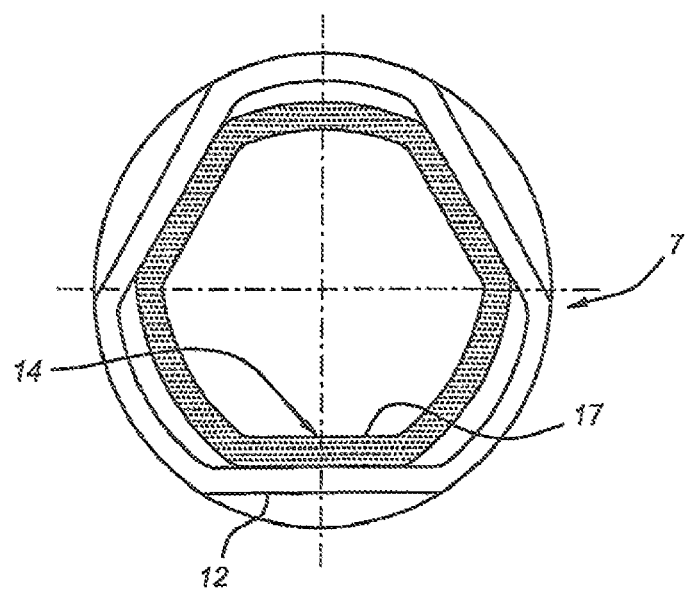
FIG. 4 shows a cross section according to IV-IV of FIG. 3.

In this embodiment, the sheet metal element 14 is of prismatic shape and has a triangular form, as shown in the cross sections of FIGS. 4 and 5, over its full length. Thereby, the rectilinear wall parts 17 of the sheet metal element 14 on the one hand tightly fit within the rectilinear wall parts 12 of the cap 7 (FIG. 4). On the other hand, the rectilinear wall parts 17 and the bent wall parts 18 of the sheet metal element 14 tightly enclose the corresponding wall parts 25, 26 of the axle stub 24 of the constant velocity joint 19 (FIG. 5).

By means of the screw 34, extending through hole 33 in the cap 7 and screwed into the screw threaded bore 32 in the axle stub 24, the sheet metal element 14 is firmly held between the cap 7 and the shoulder 31 surrounding the axle stub 24 of the constant velocity joint 19.

Thus, in this embodiment the sheet metal element 14 serves as a torque transfer means for transferring the driving couple from the constant velocity joint 19 to the cap 7 and inner ring 2 of the bearing unit 1.

Figure 6:
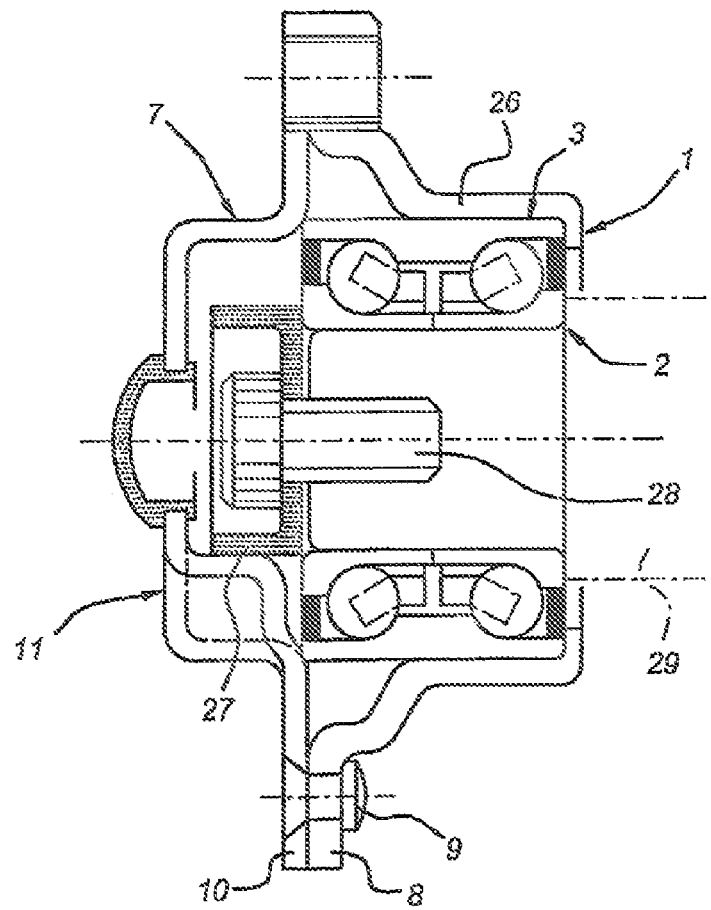
FIG. 6 shows a further example of a bearing unit.

The embodiment of FIG. 6 shows a bearing unit, one having an inner ring 2 and an outer ring 3. The outer ring 3 is accommodated within an outer sheet metal element 26, onto which the cap 7 has been mounted by means of rivets 9. This cap again has a non-circular part 11 and a flange 10. Within the non-circular part 11 the correspondingly shaped, non-circular fixing part 27 is fitted, which by means of the screw threaded hole connection 28 firmly joins a shaft 29 to the inner ring 2 of the bearing unit 1.

Figure 7:
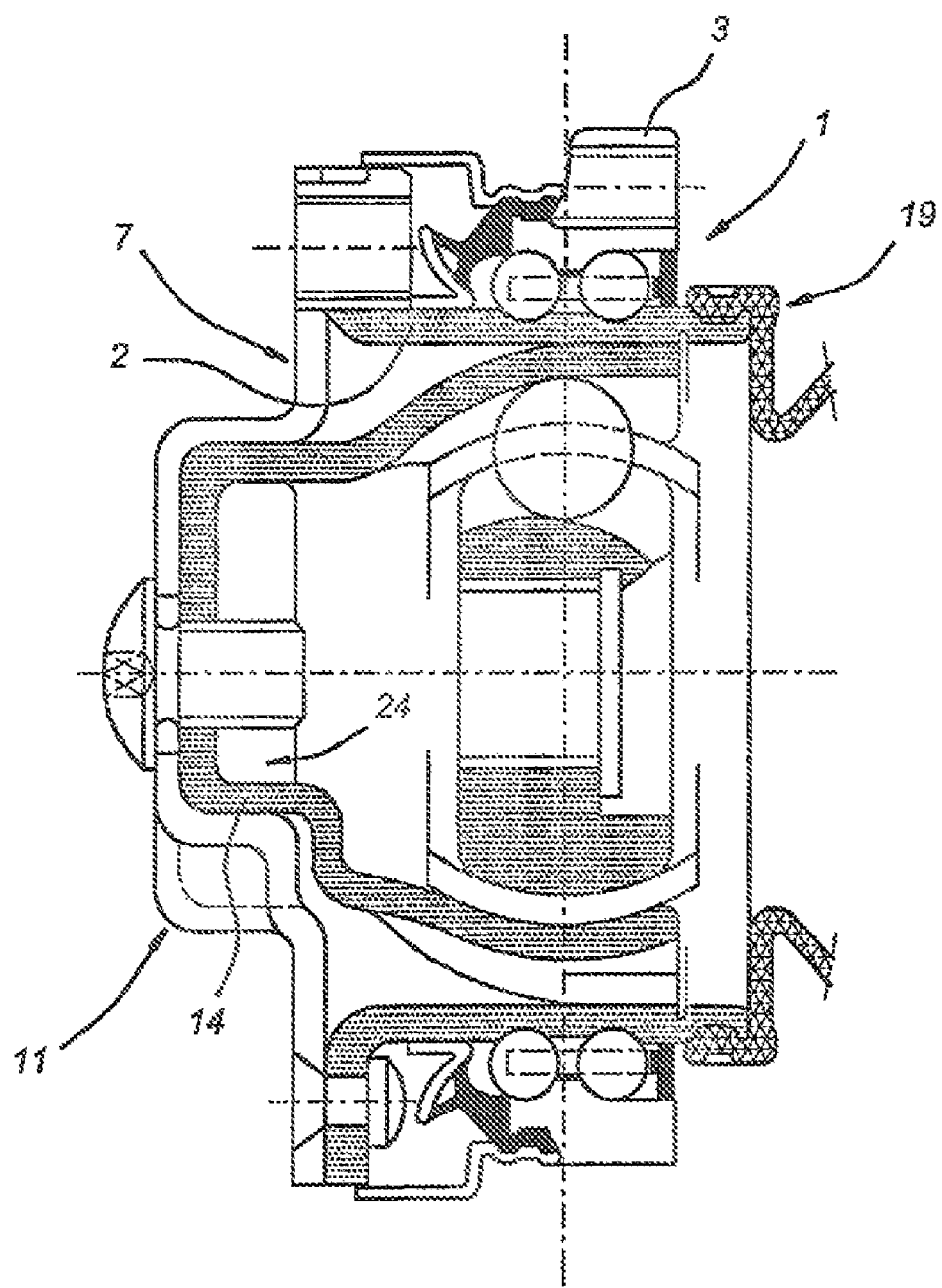
FIG. 7 shows a further example of a bearing unit with a constant velocity joint.

In the embodiment of FIG. 7, the non-circular axle stub 24 of the constant velocity joint 19 is directly and tightly fitted within the correspondingly shaped, noncircular counterpart 11 of the cap 7 which is connected to the inner ring 2 of the bearing unit 1.

The bearing unit according to the invention can be applied in many different fields. It is applicable in both road and off-road vehicles, railed vehicles etc. In particular the bearing unit is suitable for wheel ends for cars, trucks, trailers, trains, motorbikes and industrial applications. For instance, the bearing unit can be applied in the gears or bearing units in drive systems, water pumps etc. Moreover, a modular assembly is possible.

The invention claimed is:

1. A bearing unit, comprising a rolling element bearing, said bearing comprising an outer ring and an inner ring, said outer ring and said inner ring each provided with at least one raceway and at least one set of rolling elements which are in contact with the raceways, the bearing unit further comprising at least one tubular sheet metal element, and a cap, said tubular sheet metal element and said cap both connected to said inner ring, wherein the sheet metal element has a circular part and a non-circular part, said circular part opposite an inner surface of said inner ring and said non-circular part interfacing with a correspondingly non-circular counter-part of said cap.

2. A bearing unit according to claim 1, wherein the sheet metal element extends through the inner ring.

3. A bearing unit according to claim 2, wherein the sheet metal element has an end wall.

4. A bearing unit according to claim 3, wherein the cap and the end wall of the sheet metal element are connected to each other through a screw/nut connection.

5. A bearing unit according to claim 1, wherein the circular part of the sheet metal element is tightly fitted within the inner ring.

6. A bearing unit according to claim 1, wherein the cross section of the non-circular part comprises several three rectilinear wall sections which are angled with respect to each other.

7. A bearing unit according claim 1, wherein a constant velocity joint is provided, said constant velocity joint comprising the tubular sheet metal element.

8. A bearing unit according to claim 7, wherein the constant velocity joint has an axle stub provided with a non-circular cross section, said axle stub being tightly fitted within a correspondingly shaped space in the tubular sheet metal element.

9. A bearing unit according to claim 8, wherein the axle stub has a shoulder onto which one end of the tubular sheet metal element bears.

10. A bearing unit according to claim 9, wherein the axle stub comprises a screw threaded bore and the end cap comprises an aligned opening, said cap, sheet metal element and axle stub being drawn together by means of a screw accommodated in the opening and in the screw threaded bore.

11. A bearing unit according to claim 7, wherein the sheet metal element forms an integrated part of the constant velocity joint, said part being of non-circular cross section and being tightly fitted within a correspondingly non-circular hollow part of the cap.

12. A bearing unit according to claim 8, wherein a power data coupler is integrated with or added onto the bearing unit.

13. A bearing unit according to claim 1, wherein double row angular contact rolling elements are provided.

14. A bearing unit according to claim 1, wherein the rolling elements comprises balls, rollers or a combination thereof.

15. A bearing unit according to claim 1, wherein the raceways of the rolling elements have different diameters.

16. A bearing unit according to claim 1, wherein the bearing unit is greased and permanently sealed.

17. A bearing unit according to claim 1, wherein the materials used are selected from the class consisting of metallic, non-metallic, composite, power pressed and combinations thereof.

18. A bearing unit according to claim 1, wherein at least one sensor device is integrated or added on for measuring or monitoring load, temperature, rotational speed, vibrations, tire pressure and/or drive torque.

19. A bearing unit according to claim 1, wherein at least one sensor is provided in combination with a power data coupler.

20. A bearing unit according to claim 1, wherein a gear is connected to said inner ring or said outer ring.

21. A bearing unit according to claim 1, wherein said cap and said inner ring are connected using joining techniques that include at least one of the following: mechanical means, including rivets, energy welding, laser welding, spot welding, cold rolling, cold orbital forming, or glueing.

22. A bearing unit according to claim 1, wherein said inner ring has a cylindrical inner bore.

* * * * *